United States Patent Office 3,629,343
Patented Dec. 21, 1971

3,629,343
PROCESS FOR THE PRODUCTION OF
ALKYLENE GLYCOLS
Semen Zakharovich Levin and Aron Leibovich Shapiro,
Leningrad, U.S.S.R., assignors to Vsesojuzny Nauchno-
Issledovatelsky Institut Neftekhimicheskikh Protsessov,
Leningrad, U.S.S.R.
No Drawing. Filed Oct. 11, 1968, Ser. No. 766,995
Int. Cl. C07c 31/20
U.S. Cl. 260—635 E 8 Claims

ABSTRACT OF THE DISCLOSURE

A process for the production of alkylene glycols by the catalytic hydration of alkylene oxides in the presence of carbon dioxide under a pressure of 10–180 atm. and at a temperature of 80–220° C., employing as catalyst alkali metal halides and compounds of the formula

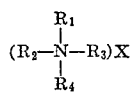

wherein $R_1$, $R_2$, $R_3$ and $R_4$ are hydrogen or alkyl, and X is chlorine, bromine or iodine.

---

This invention relates to processes for the production of alkylene glycols.

Processes are known for the production of alkylene glycols by the catalytic hydration of alkeylene oxides with heating.

Thus a process is known for the production of ethylene glycol by the catalytic hydration of ethylene oxide at 200–400° C., in the presence of calcium phosphates as catalyst.

A deficiency of said known processes is the necessity of using a large excess of water, the molar ratio of alkylene oxides to water being from 1:6 to 1:17, in order to avoid the formation of di-, tri-, and polyalkylene glycols. As a consequence of employing a large excess of water only a 15–20%, or at the best 35%, aqueous solution of alkylene glycol is obtained. In order to produce concentrated alkylene glycol the water must be distilled off which involves large power consumption and also substantial capital expenditures in building industrial units. Thus to produce one ton of ethylene glycol requires distilling off about 4–6 tons of water.

The yield om monoalkylene glycols in said known processes amounts to ~90% by weight of theory.

It is, accordingly, an object of the present invention to eliminate the above deficiencies.

It is a further and more specific object of the invention to provide a process for the production of alkylene glycols making it possible to carry out the reaction without an excess or with only a slight excess of water and also to increase the yield of monoalkylene glycols to ~97% by weight of theory.

The foregoing and other objects have been accomplished by the provision of a process for the production of alkylene glycols by the catalytic hydration of alkylene oxides with heating, wherein, according to the invention, the hydration of alkylene oxides is carried out in the presence of carbon dioxide under a pressure of 10–180 atm., preferably 20–40 atm., at a temperature of 80–220° C., preferably 120–180° C., employing as a catalyst alkali halides or compounds of the general formula

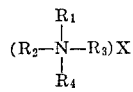

where $R_1$, $R_2$, $R_3$ and $R_4$ are independently selected from the group consisting of hydrogen or alkyl, and X is chlorine, bromine or iodine.

Examples of compounds of the above general formula are halo salts of tetra-alkyl ammonium (tetramethylammonium iodide, tetraethylammonium bromide) and halo acid salts of amines (triethylamine hydroiodide, propylamine hydroiodide, diethylamine hydrochloride).

Of the foregoing classes of componuds, the best results are obtained when the bromides and iodides are used as catalysts.

In order to obtain the foregoing catalysts in the reaction mixture, substances may be added to said mixture which form the desired catalyst; i.e., the catalyst may be formed in situ. Examples of such substances are a mixture of triethylamine and ethyl iodide which forms tetraethylammonium iodide, a mixture of ethylene iodohydrin and potassium carbonate which forms potassium iodide, a mixture of tripropylamine and propyl bromide which forms tetrapropylammonium bromide and a mixture of propylene bromohydrin and sodium carbonate which forms sodium bromide.

It is expedient to use the above catalysts in the amount of 0.1–5%, preferably 0.3–1.5%, based on the weight of the mixture of alkylene oxides and water.

To diminish the formation of dialkylene glycols and accelerate the reaction, the hydration of alkylene oxides is carried out in the presence of compounds of basic character, e.g. carbonates, bicarbonates or hydroxides of alkali metals, in the amount based on 0.1–2% of the weight of the mixture of alkylene oxides and water. Alkylene oxides and water are taken in a molar ratio from 1:1 to 1:1.3, preferably 1:1.1.

The essence of the present process is illustrated by the reactions involved in the production of ethylene glycol which can be indicated as follows:

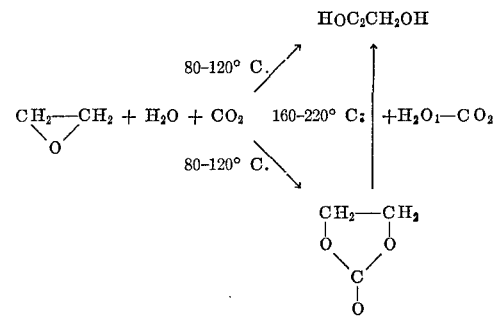

The velocity of the reaction of ethylene oxide wtih carbon dioxide is higher than the velocity of the reaction of ethylene oxide with water, and hydrolysis of the intermediate product formed (ethylene carbonate), even when there is a stoichimetric amount of water, gives practically only ethylene glycol.

From the reactions revealed above it is apparent that carbon dioxide is not consumed in the production of ethylene glycol but makes it possible to carry out the process in the required direction.

The present process for the production of alkylene glycols can be carried out batchwise or continuously.

In the batch process alkylene oxide, water and the catalyst are charged into an autoclave fitted with a stirrer, whereupon carbon dioxide is fed into the autoclave to a pressure of 10–30 atm. The mixture is heated with continuous stirring to a temperature of 80–130° C.; at first this causes the pressure to rise, but as the foregoing temperature is maintained, the pressure begins to fall. When the pressure has ceased falling, the temperature is raised to 180–220° C. and maintained constant until the pressure ceases to increase. The pressure is then released and the catalysate is fractionated under vacuum.

The batch process can also be carried out while maintaining constant pressure in the autoclave.

The continuous process of producing alkylene glycols can be carried out in two consecutively connected reactors. Alkylene oxide, water, catalyst and carbon dixode are charged into the lower part of the first reactor, and from its upper part the reaction mixture passes into the lower part of the second reactor. The temperature in the first reactor is 80–120° C., and in the second reactor, 160–220° C. The pressure in the system is 15–40 atm. Carbon dioxide is circulated in the system by means of a circulating gas pump.

The continuous process can also be carried out in a single reactor, preferably at a temperature of 160–220° C. and a pressure of 20–60 atm.

Both the batch and continuous processes can be carried out under adiabatic conditions.

For a better understanding of the present invention the following examples of the preparation alkylene glycols, are given by way of illustration.

EXAMPLE 1

Into a 1000 ml. autoclave equipped with stirrer are placed 180 g. of ethylene oxide, 74 g. of water, 2 g. of tetramethylammonium iodide and 1 g. of sodium bicarbonate, and carbon dioxide is passed in until the pressure in the autoclave reaches 30 atm. The reaction mixture is heated to 100° C. and the temperature gradually raised to 200° C. At the end of the reaction the pressure reaches 140 atm.

After the pressure is released the catalysate is fractionated under vacuum to give 237 g. of monoethylene glycol, corresponding to a yield of 96% by weight of theory on the basis of the ethylene oxide charged, and 7 g. of diethylene glycol.

EXAMPLE 2

Into a 1000 ml. autoclave equipped with stirrer are placed 180 g. of ethylene oxide, 74 g. of water and 1.5 g. of tetraethylammonium bromide, and carbon dioxide is passed in until the pressure in the autoclave reaches 30 atm. The reaction mixture is heated to 130° C. and this temperature is maintained for 25 min. The mixture is then heated to 200–220° C. and this temperature is maintained until the pressure stops rising.

After the pressure is released the catalysate is fractionated under vacuum to give 223 g. of monoethylene glycol, corresponding to a yield of 89% by weight of theory on the basis of the ethylene oxide charged, and 16 g. of diethylene glycol.

EXAMPLE 3

Into a 1000 ml. autoclave equipped with stirrer are placed 180 g. of ethylene oxide, 40 g. of water and 2 g. of triethylamine hydroiodide, and carbon dioxide is passed in until the pressure in the autoclave reaches 30 atm. The reaction mixture is heated to 130° C. and this temperature is maintained with stirring for 35 min., after which 36 ml. of 3% aqueous potassium bicarbonate solution are added and the reaction mixture heated to 180° C. and held at this temperature for 40 min. until the pressure stops rising.

After the pressure is released the reaction products are fractionated under vacuum to give 240 g. of monoethylene glycol, corresponding to a yield of 97% by weight of theory on the basis of the ethylene oxide charged, and 2 g. of diethylene glycol.

EXAMPLE 4

Into a 1000 ml. autoclave equipped with stirrer are placed 180 g. of ethylene oxide, 74 g. of water, 2 g. of propylamine hydroiodide and 1 g. of potassium bicarbonate. The reaction mixture is heated to 130° C. and held at this temperature for 30 min., maintaining the pressure in the system at ~20 atm. by continuously passing carbon dioxide into the autoclave. The carbon dioxide feed is then stopped and the reaction mixture heated to 180–220° C. and held at this temperature for 35 min.

After the pressure is released 254 g. of catalysate are discharged and fractionated under vacuum to give 230 g. of ethylene glycol, corresponding to a yield of 92% by weight of theory on the basis of the ethylene oxide, and 13 g. of diethylene glycol.

EXAMPLE 5

Into a 1000 ml. autoclave equipped with stirrer are placed 174 g. of propylene oxide, 56 g. of water, 2 g. of tetramethylammonium iodide and 1 g. of sodium bicarbonate, and carbon dioxide is passed in until the pressure in the autoclave reaches 10 atm. The reaction mixture is heated, being held at 140° C. for 30 min. and then at 200° C. for 40 min. At the end of the run the pressure reaches 120 atm.

After the pressure is released the reaction products are fractionated under vacuum to give 213 g. of propylene glycol, corresponding to a yield of 93% by weight of theory on the basis of the propylene oxide, and 10 g. of dipropylene glycol.

EXAMPLE 6

Into a 1000 ml. autoclave equipped with stirrer are placed 150 g. of 1-hexene oxide, 30 g. of water, 2.5 g. of diethylamine hydrochloride and 0.5 g. of sodium carbonate. The reaction mixture is heated to 140° C. with stirring and held at this temperature for 30 min., maintaining the pressure in the system at ~30 atm. by continuously passing carbon dioxide into the autoclave. The carbon dioxide feed is then stopped and the reaction mixture heated to 180–220° C. and held at this temperature for 1 hr.

After the pressure is released the catalysate is fractionated under vacuum to give monohexene glycol in a yield of 52% by weight of theory on the basis of the 1-hexene oxide.

EXAMPLE 7

Into a 1000 ml. autoclave equipped with a stirrer are placed 180 g. of ethylene oxide, 74 g. of water, 1 g. of triethylamine, 1.5 g. of ethylene iodide and 1 g. of sodium bicarbonate. The reaction mixture is held at a temperature of 120° C. for 30 min., maintaining the pressure in the system at ~20 atm. by continuously passing carbon dioxide into the autoclave. The carbon dioxide feed is then stopped and the reaction mixture held at 180–220° C. for 40 min.

After the pressure is released the reaction products are fractionated under vacuum to give 238 g. of monoethylene glycol, corresponding to a yield of 96% by weight of theory on the basis of the ethylene oxide, and 6 g. of diethylene glycol.

EXAMPLE 8

The reaction is carried out in two continuously operating and consecutively arranged reactors. Into the lower part of the first reactor is fed a mixture consisting of 81% ethylene oxide, 18% water, 1% tetraethylammonium iodide, and carbon dioxide. From the upper part of the first reactor the reaction mixture passes into the lower part of the second reactor into which is also fed a 3% aqueous sodium bicarbonate solution. In the first reactor the temperature is held at 120° C. and in the second reactor, at 200° C. The pressure in the system is 25 atm. Carbond ioxide is circulated through the system by means of a circulating gas pump.

The volume rate of feed of reaction mixture into the first reactor is 0.7 volume per 1 volume of reactor per hr. The volume rate of feed of the 3% aqueous sodium bicarbonate solution into the second reactor is 0.1 volume per 1 volume of reactor per hr. The yield of ethylene glycol is 96% by weight of theory on the basis of the ethylene oxide.

EXAMPLE 9

Into a 1000 ml. reactor equipped with a stirrer are placed 180 g. of ethylene oxide, 74 g. of water and 2 g. of potassium iodide, after which carbon dioxide is passed in until the pressure reaches 30–35 atm. The reaction mixture is heated to 130° C. and held at this temperature for 15 min.; the reaction mixture is then heated to 200–220° C. and held at this temperature for 2 hr. The pressure at the end of the experiment run reaches 130 atm.

After the pressure is released the reaction products are fractionated under vacuum to give 225 g. of monoethylene glycol, corresponding to a yield of 90% by weight of theory on the basis of the ethylene oxide, and 15 g. of diethylene glycol.

EXAMPLE 10

Into a 1000 ml. autoclave equipped with a stirrer are placed 174 g. of propylene oxide, 56 g. of water, 3 g. of sodium iodide and 1 g. of sodium bicarbonate, and carbon dioxide is passed in until a pressure of 15 atom. is reached, this pressure being constantly maintained. The reaction mixture is heated to 120° and then raised to 180–200° over a period of 80 min.

After the pressure is released, 214 g. of catalysate are discharged and fractionated under vacuum. The yield of monopropylene glycol is 92.5% by weight of theory on the basis of the propylene oxide.

EXAMPLE 11

Into a 1000 ml. autoclave equipped with a stirrer are placed 180 g. of ethylene oxide, 40 g. of water and 2 g. of potassium bromide, and carbon dioxide is passed in until the pressure in the autoclave reaches 30 atm. The reaction mixture is heated to 120° C. and held at this temperature ofr 1 hr., whereupon 35 ml. of a 3% aqueous potassium bicarbonate solution are added and the reaction mixture is heated to 180–200° C. and held at this temperature 40 min. until the pressure stops rising.

After the pressure is released the reaction mixture is discharged and fractionated under vacuum to give 241 g. of monoethylene glycol, corresponding to a yield of 97% by weight of theory on the basis of the ethylene oxide.

EXAMPLE 12

Into a 1000 ml. autoclave equipped with a stirrer are placed 180 g. of ethylene oxide, 74 g. of water, 0.7 g. of ilthium bromide and 0.4 g. of sodium hydroxide, and carbon dioxide is passed in until the pressure in the autoclave reaches 50 atm. this pressure being constantly maintained. The reaction mixture is heated to 120° C. and held at this temperature for 20 min. and is then heated to 200° C. and held at this temperature for 40 min.

After the pressure is released the catalysate is fractionated under vacuum to give 227 g. of monoethylene glycol, corresponding to a yield of 91% by weight of theory on the basis of the ethylene oxide, and 16 g. of diethylene glycol.

EXAMPLE 13

Into a 1000 ml. autoclave equipped with a stirrer are placed 174 g. of propylene oxide, 56 g. of water, 2 g. of potassium iodide and 1 g. of potassium bicarbonate, and carbon dioxide is passed in until the pressure in the autoclave reaches 30 atm., this pressure being constantly maintained. The reaction mixture is heated to 120° C. for 3–4 min. and then to 200° C. for 80 min.

After the pressure is released the catalysate is fractionated under vacuum to give 212 g. of propylene glycol, corresponding to a yield of 93% by weight of theory on the basis of the propylene oxide, and 11 g. of dipropylene glycol.

EXAMPLE 14

Into a 1000 ml. autoclave equipped with a stirrer are placed 180 g. of ethylene oxide, 74 g. of water, 2 g. of ethylene iodohydrin and 2.2 g. of potassium bicarbonate, and carbon dioxide is passed in until the pressure in the autoclave reaches 30 atm., this pressure being constantly maintained. The reaction mixture is first heated to 120° C. and held at this temperature for 30 min., and then heated to 180–220° C. and held at this temperature for 40 min.

After completion of the reaction the pressure is released and the catalysate fractionated under vacuum to give 236 g. of monoethylene glycol, corresponding to a yield of 95.3% by weight of theory on the basis of the ethylene oxide, and 7 g. of diethylene glycol.

EXAMPLE 15

The process for the production of ethylene glycol is carried out under adiabatic conditions.

Into a 1000 ml. autoclave equipped with a stirrer is placed a thin-walled, heat-insulated beaker, and into the beaker is placed a sealed ampule containing 140 g. of ethylene oxide, 74 g. of water, 1.6 g. of sodium iodide and 1 g. of sodium bicarbonate. Carbon dioxide is then passed into the autoclave until the pressure reaches 20 atm. The temperature is raised to 120° C., after which the ampule is broken by starting the stirrer. In 5 min. the temperature rises to 215° C. due to the heat of the reaction. The reaction mixture is held at this temperature for 10 min. The pressure in the system at the end of the runs reaches 180 atm.

After the autoclave has been cooled and the pressure released, the reaction products are discharged and fractionated under vacuum to give 172 g. of ethylene glycol and 11 g. of diethylene glycol.

EXAMPLE 16

The process is carried out in two continuously operating and consecutively arranged reactors. Into the lower part of the first reactor is fed a mixture consisting of 68.7% of ethylene oxide, 29.7% water, 0.8% sodium iodide, 0.8% bicarbonate, and separately, carbon dioxide. From the upper part of the first reactor the reaction mixture passes into the lower part of the second reactor. The temperature in the first reactor is 120° C., and in the second reactor, 200° C. The pressure in the system is 30 atm.

Carbon dioxide is circulated through the system by means of a circulating gas pump. The volume rate of feed of the raw material into the first reactor is 0.3 volume per 1 volume of the reactor per hr. The yield of ethylene glycol is 96% by weight of theory on the basis of the ethylene oxide.

EXAMPLE 17

Into a 1000 ml. autoclave equipped with a stirrer are placed 174 g. of propylene oxide, 56 g. of water, 1 g. of tripropylamine, 1 g. of propyl bromide and 1 g. of sodium carbonate. The reaction mixture is heated to 140° C. and held at this temperature for 10 min., maintaining the pressure in the system at 40 atm. by continuously passing carbon dioxide into the autoclave. The carbon dioxide feed is then stopped and the reaction mixture is heated to 200° C. and held at this temperature for 45 min.

After the pressure is released the catalysate is fractionated under vacuum to give 216 g. of propylene glycol, corresponding to a yield of 95.5% by weight of theory on the basis of the propylene oxide, and 6 g. of dipropylene glycol.

EXAMPLE 18

Into a 1000 ml. autoclave equipped with a stirrer are placed 180 g. of ethylene oxide, 74 g. of water, 2 g. of propylene bromohydrin and 1.5 g. of sodium carbonate. The reaction mixture is heated to 130° C. and held at this temperature for 15 min., maintaining the pressure in the system at 35 atm. by continuously passing carbon dioxide into the autoclave. The carbon dioxide feed is then stopped and the reaction mixture is heated to 180–190°

C. and held at this temperature until the pressure stops rising.

After the pressure is released the reaction products are fractionated under vacuum to give 238 g. of monoethylene glycol, corresponding to a yield of 96% by weight of theory on the basis of the ethylene oxide, and 4 g. of diethylene glycol.

Though the present invention has been described in accordance with a preferred embodiment, various changes and modifications may be made in carrying out the present invention without departing from the spirit and scope thereof, as will be understood by those skilled in the art. These changes and modifications are to be considered as falling within the spirit and scope of the invention as defined in the appended claims.

What is claimed is:

1. A process for the production of an alkylene glycol which comprises hydrating an alkylene oxide with an equimolar amount or a slight molar excess of water in the presence of carbon dioxide at a carbon dioxide pressure of 10–180 atm. and a temperature of 80–220° C., and as a catalyst, 0.1–5% by weight of a compound selected from the group consisting of alkali metal halides and compounds of the formula

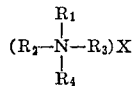

wherein $R_1$, $R_2$, $R_3$ and $R_4$ are selected from the group consisting of hydrogen and alkyl, and X is a halogen selected from the group consisting of chlorine, bromine and iodine.

2. A process as claimed in claim 1, wherein the catalyst is formed in situ from substances which form the said catalyst.

3. A process as claimed in claim 1, wherein the hydration is carried out in the co-presence of a compound of basic character selected from the group consisting of alkali metal carbonates, bicarbonates and hydroxides in the amount of 0.1–2% of the weight of the alkylene oxide and water.

4. A process as claimed in claim 2, wherein the hydration is carried out in the co-presence of a compound of basic character selected from the group consisting of alkali metal carbonates, bicarbonates and hydroxides in the amount of 0.1–2% of the weight of the alkylene oxide and water.

5. A process as claimed in claim 1, wherein the alkylene oxide and water are present in the molar ratio of from 1:1 to 1:1.3.

6. A process as claimed in claim 2, wherein the alkylene oxide and water are present in the molar ratio of from 1:1 to 1:1.3.

7. A process as claimed in claim 3, wherein the alkylene oxide and water are present in the molar ratio of from 1:1 to 1:1.3.

8. A process as claimed in claim 4, wherein the alkylene oxide and water are present in the molar ratio of from 1:1 to 1:1.3.

References Cited

UNITED STATES PATENTS

| | | | |
|---|---|---|---|
| 2,623,909 | 12/1952 | Robeson et al. | 260—635 E |
| 2,636,906 | 4/1953 | Davis | 260—635 E |
| 2,650,940 | 9/1953 | Young | 260—635 E |
| 3,475,499 | 10/1969 | Winnick | 260—635 E |

OTHER REFERENCES

Lange: "Handbook of Chemistry," 10th ed. (1961), pp. 800–807, TP 151 H 25.

LEON ZITVER, Primary Examiner

J. E. EVANS Assistant Examiner

U.S. Cl. X.R.

23—89; 260—340.9, 567.6 M, 615 R

UNITED STATES PATENT OFFICE
CERTIFICATE OF CORRECTION

Patent No. 3,629,343          Dated December 21, 1971

Inventor(s) Semen Zakharovich Levin, Aron Leibovich Shapiro

It is certified that error appears in the above-identified patent and that said Letters Patent are hereby corrected as shown below:

Column 1, line 31: change "alkeylene" to --alkylene-- line 49: change "om" to --of--

Column 2, line 9: change "compondus" to --compounds-- line 30: rewrite "in the amount based on 0.1-2% of" as follows: --in the amount of 0.1-2% based on-- lines 40-50: rewrite the right-hand side of the reaction as follows:

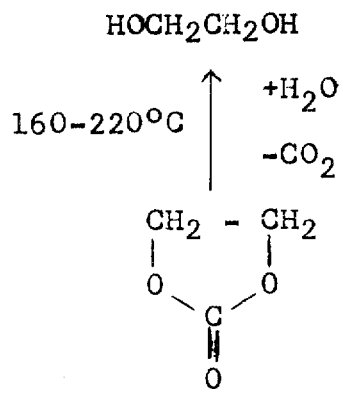

line 56: change "stoichimetric" to --stoichiometric--

UNITED STATES PATENT OFFICE
CERTIFICATE OF CORRECTION

Patent No. 3,629,343          Dated December 21, 1971

Inventor(s) Semen Zakharovich Levin, Aron Leibovich Shapiro

It is certified that error appears in the above-identified patent and that said Letters Patent are hereby corrected as shown below:

Page 2

Column 3, line 20: after the word "preparation" insert --of-- lines 25, 40, 54 and 70: before "stirrer" insert --a--

Column 4, lines 11, 26 and 41: before "stirrer" insert --a-- line 16: delete ", being" and substitute in lieu thereof --with stirring and-- line 67: change "Carbond ioxide" to -- Carbon dioxide line 69: before the word "reaction" insert --the--

Column 5, line 10: delete the word "experiment"

line 20: change "atom." to --atm.-- lines 21, 48, 63 and 64: change "constantly maintained to --maintained constant-- line 22: after "then" insert --the temperature is-- line 35: change "ofr" to --for-- line 46: change "ilthium" to --lithium--

UNITED STATES PATENT OFFICE
CERTIFICATE OF CORRECTION

Patent No. 3,629,343　　　　　　　　　　Dated December 21, 1971

Inventor(s) Semen Zakharovich Levin, Aron Leibovich Shapiro

It is certified that error appears in the above-identified patent and that said Letters Patent are hereby corrected as shown below:

Page 3

Column 6, lines 2-3: change "constantly maintained" to

--maintained constant-- line 27: change "runs" to --run-- line 38: before "bicarbonate" insert --sodium--

Signed and sealed this 26th day of March 1974.

(SEAL)
Attest:

EDWARD M. FLETCHER, JR.　　　　　　C. MARSHALL DANN
Attesting Officer　　　　　　　　　　Commissioner of Patents